Feb. 25, 1969     K. H. HOHENEMSER     3,429,376
AUTOMATIC CONTROL SYSTEM FOR AIRCRAFT LIFTING ROTOR
Filed Oct. 18, 1966             Sheet 1 of 2
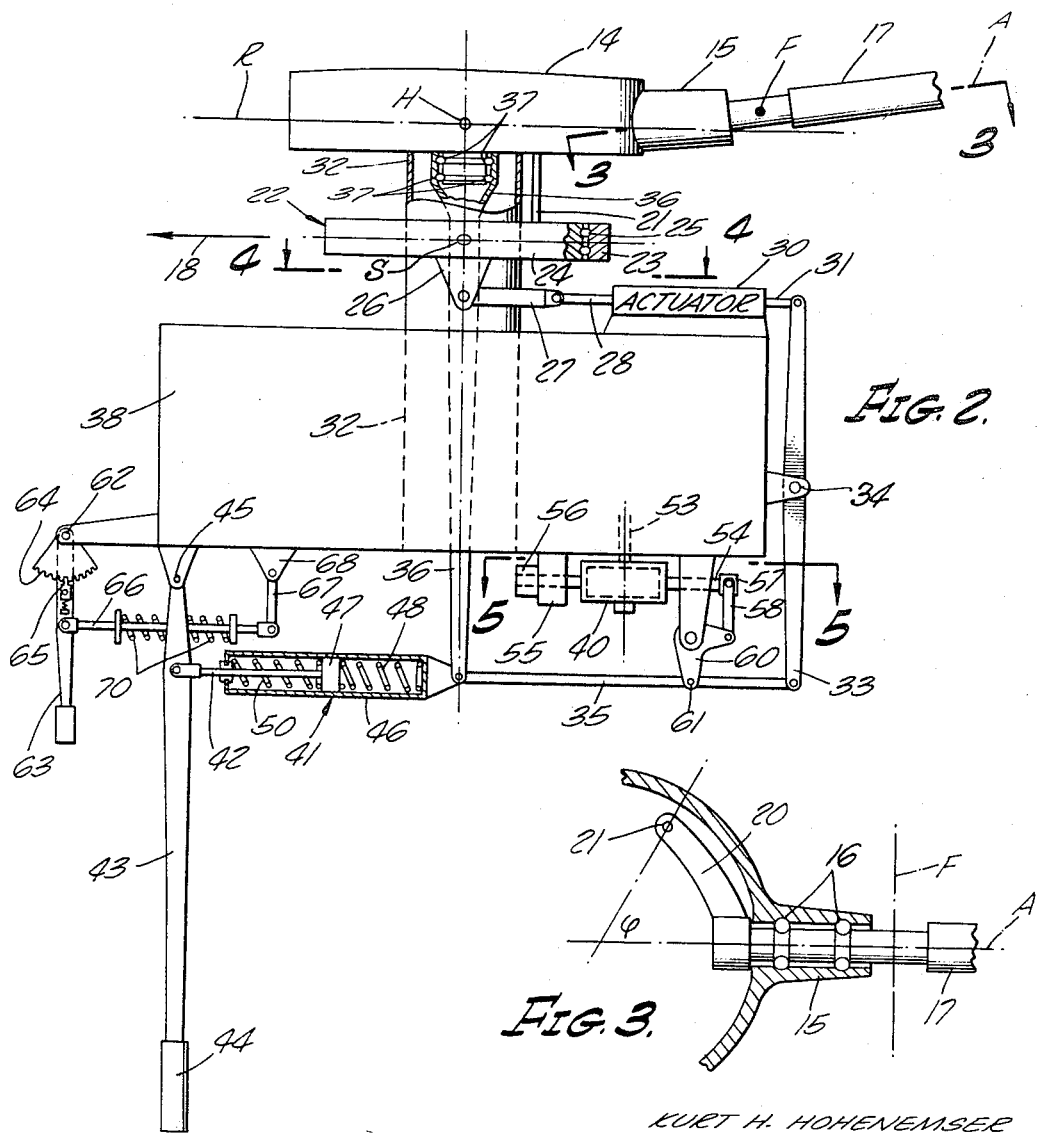
INVENTOR.
KURT H. HOHENEMSER
BY
ATTORNEY

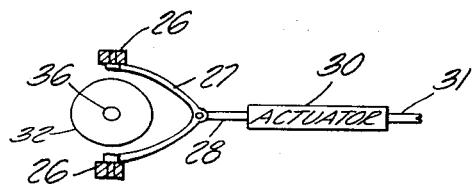
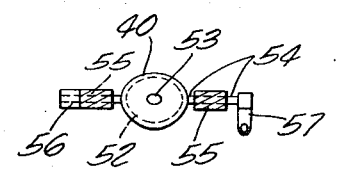
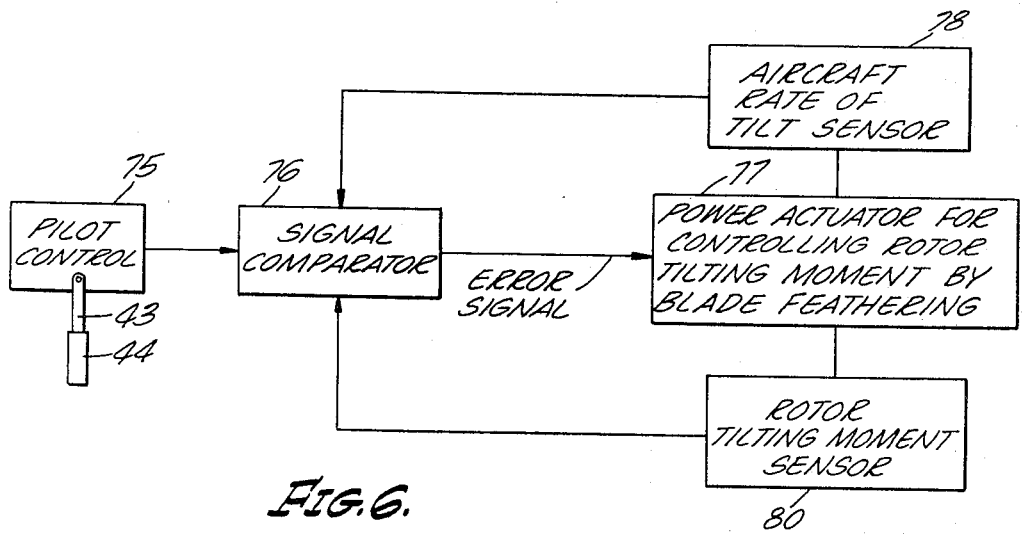
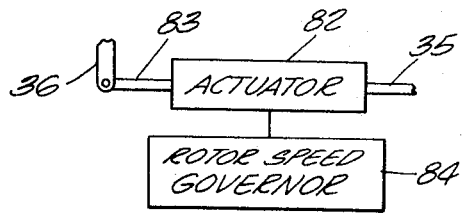
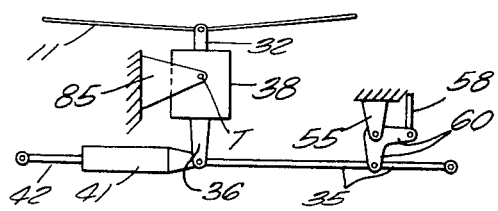

United States Patent Office 3,429,376
Patented Feb. 25, 1969

3,429,376
AUTOMATIC CONTROL SYSTEM FOR
AIRCRAFT LIFTING ROTOR
Kurt H. Hohenemser, 2421 Remington Lane,
St. Louis, Mo. 63144
Filed Oct. 18, 1966, Ser. No. 587,486
U.S. Cl. 170—160.25                 14 Claims
Int. Cl. B64c 27/56, 27/66

ABSTRACT OF THE DISCLOSURE

An automatic control system for aircraft, particularly helicopters and the like having rotary wings. The control system includes rotor tilting moment sensors which develop signals in proportion to the tilting moment on the rotor with respect to the airframe of the aircraft. Accordingly the effects of gusts or of maneuvers on the rotor tilting moments are automatically removed. The rotor tilting moment on the airframe is determined by the pilot's demand signal and not by extraneous causes. This automatic control system may be supplemented by conventional automatic controls using gyro sensors. Since the unstable characteristics of the lifting rotor are removed by the automatic control system of the invention, the remainder of the automatic control system may be made very simple.

---

This invention relates generally to aircraft of the type having a lifting rotor, and particularly relates to an automatic system for controlling the tilt of such aircraft.

There are two general classes of lifting rotors, a lifting rotor being defined as a rotor which produces lift of the aircraft and remains substantially horizontal in forward flight of the aircraft. Flapping blade rotors and rigid blade rotors form these two classes of rotors. Blade flapping means a vertical motion of a blade of a rotor about a hinge disposed close to the rotor center. A rigid lifting rotor may be defined as a rotor where the blades are not hinged to the rotor. However, since the blade is flexible, vertical motions of the blade tips are possible even in a rigid lifting rotor.

In the early history of rotary wing aircraft it was found that rigid lifting rotors were impractical. This is due to the large aerodynamic and gyroscopic pitching and rolling moments of such a rotor which make the aircraft oversensitive in pitch and roll control and in gust response. In this connection a pitching moment is a moment about the transverse axis of the aircraft while a rolling moment is a moment about the longitudinal axis. A tilting moment is meant to include both rolling and pitching moments, that is, it is a moment about either the transverse or the longitudinal aircraft axis. Thus, in the past flapping blade rotors have been generally used, where the rotor blades are either individually hinged to the rotor or where the blade-hub connection is rigid but the hub is hinged to the rotor shaft so that opposite blades are free to flap in opposite directions. Aircraft with flapping blade rotors have zero or small pitching or rolling (or tilting) moments about the rotor center and were found to be relatively easy to control in pitch and roll by tilting of the blade tip path plane.

Flapping blade rotors have, however, the disadvantage that sizeable blade flapping excursions may occur in response to gusts or maneuvers. This property of a flapping blade rotor makes it difficult to prevent pitching and rolling of the aircraft even under moderately turbulent conditions and excludes the use of rotary wing aircraft for purposes where a stable attitude is required. Blade flapping from gusts or maneuvers becomes prohibitive, for example, at a high advance ratio which is the ratio of forward flight speed over the rotational blade tip speed. Under these conditions the rotational blade tip speed is slowed down while the flight speed increases. This may occur in compound fixed-wing, rotary wing aircraft or in tilting rotor convertiplanes where the rotor is called upon to operate as a prop rotor with its axis tilted forward through 90°. A prop rotor is a lifting rotor capable of being tilted forward by 90° to be used as a propeller.

Because of the simplicity of its design and other advantages, the interest in rigid rotors has recently been revived. Rigid rotors can sustain large control moments and can operate at high advance ratios without appreciable tilting of the blade tip path plane. The aircraft can therefore be made more compact. Rigid rotors, however, are still more sensitive in tilt to gust than are flapping blade rotors. Furthermore, operation of aircraft with rigid rotors at a high advance ratio causes severe tilting moments due to gusts or maneuvers.

The automatic control system of the present invention is applicable to both flapping blade and rigid rotors. When applied to flapping blade rotors, it accomplishes the almost complete elimination of the effects of gusts or maneuver on cyclic blade flapping in pitch or roll, that is, in tilt. Cyclic blade flapping designates blade flapping oscillations with a period equal to a rotor revolution. The cyclic blade flapping may occur in pitch or roll so that the maximum up or down flapping amplitude occurs either when the blade points fore or aft, or else when the blade points right or left.

When the control system of the invention is applied to rigid rotors, rotor pitching and rolling moments from gusts or maneuvers are substantially eliminated. An aircraft having a lifting rotor with a control system according to the invention may be flown in turbulent atmosphere with a stable attitude. It is, accordingly, an object of the present invention to provide a control system for an aircraft having a lifting rotor which may have flapping blades or blades rigidly connected to the rotor and which may be flown in turbulent atmosphere with a stable attitude.

Another object of the invention is to provide a control system for an aircraft having a lifting rotor which may be operated with high advance ratio without producing either the detrimental blade flapping amplitudes of conventional flapping blade rotors or the detrimental rotor tilting moments of conventional rigid rotors.

A further object of the invention is to improve decisively the stability and control characteristics of rotary wing aircraft and to extend the speed range of such aircraft far beyond present ranges by permitting high advance ratio operation of aircraft with either flapping blade or rigid rotors.

In accordance with the present invention there is provided an automatic control system for an aircraft of the type having a lifting rotor with a plurality of blades. The control system controls the tilt of the aircraft, that is, the point or roll thereof. The control system comprises mechanism for controlling feathering of the blades to control in this manner the rotor tilting moment on the aircraft. Blade feathering is defined as the blade motion about its longitudinal axis controlled by a feathering control mechanism. The blade feathering may occur in pitch or in roll, that is, once per rotor revolution there may occur a blade feathering oscillation having a maximum amplitude when the blade points right or left or fore or aft, as the case may be. The result is a tilting moment of the rotor on the aircraft.

The control system of the invention further comprises a power actuator coupled to the blade feathering mechanism. There are further provided two sensors, one coupled to the rotor for developing output signal representative of the rotor tilting moment on the aircraft, and the second coupled to the aircraft for developing output signals representative of the rate of tilt of the aircraft. There is further a manually operable control means or pilot's control for producing control signals representative of the desired rate of aircraft tilt. A signal comparator is coupled to the pilot's control and to the two sensors for developing an error signal representative of the difference between the control signals and the output signals developed by the sensors. The error signal is impressed on means coupled to the power actuator for adjusting blade feathering until the error signal vanishes.

It has previously been proposed to reduce the gust sensitivity in tilt of lifting rotors. When utilizing a flapping blade rotor, the actual or virtual hinge axes can be inclined with respect to the blade axes by less than 90° so that flapping produces a reduction in blade feathering which is conventionally referred to as $\delta_3$ coupling. A virtual hinge axis may be provided by a suitable linkage to the blade to cause the blade to flap about an axis different from the physical hinge axis. It has also been proposed by suitably arranging the blade hinges to provide up coning of the blades (whereby all blades move in unison up or down about their hinges) to reduce thereby the collective blade feathering angle which is also referred to as collective blade coupling. Collective blade feathering means that all blades are rotated in unison about their longitudinal axes. This arrangement has proven to be quite succesful in alleviating gust effects in pitch or roll or in tilt.

There are also various mechanisms for coupling cyclic blade flapping in tilt with blade feathering in tilt. This is usually referred to as cyclic blade coupling. The purpose of this arrangement is to obtain a flat tracking rotor whose blade tip path plane always remains perpendicular to the rotor shaft.

However, none of these proposed arrangements are applicable to a rigid rotor. Furthermore, these proposed devices are only capable of a partial alleviation of the effects of gusts or maneuvers. This is so because only moderate amounts of $\delta_3$ coupling or collective blade coupling or cyclic blade coupling are feasible without encountering various forms of blade flutter.

It is accordingly, still a further object of the invention to provide a control system applicable to a rigid lifting rotor system which substantially completely eliminates gust or maneuver effects in tilt and substantially avoids blade flutter by a proper selection of the response characteristic of the power actuator.

Concerning aircraft with rigid rotors, it has been proposed in the past to provide a floating swashplate for blade feathering in tilt. A swashplate forms part of the blade feathering control system and has a rotating and a non-rotating part and can tilt about a universal hinge. A swashplate is coupled to the pilot operated control system for enforcing the position of the swashplate; this is often achieved by means of an irreversible power actuator which might also be called an insulating power actuator which insulates the input from the output. A floating swashplate seeks its equilibrium position according to the moments acting on it. Hence, the floating swashplate may be positioned under the combined effects of pilot moments and gyroscopic moments in such a way that gusts are alleviated.

However, the proposals utilizing a floating swashplate have the disadvantage that they preclude rigid positioning of the swashplate by irreversible power actuators. Such irreversible or insulating power actuators are presently used in all lifting rotor systems of larger size. This prevents dynamic interactions between the blades which may induce blade flutter. Blade flutter is due to self-excited blade oscillations which are usually destructive. It may be noted that a power actuator produces displacements of an actuating link in response to input signals. The actuator may be powered by electrical, hydraulic, pneumatic or mechanical forces.

It is, therefore, yet another object of the present invention to provide a control system for a lifting rotor where irreversible power actuators may be used for blade feathering in tilt.

Further proposals have been made to augment the natural rotor tilt damping. Thus pitch or roll damping moments are proportional to the rates of tilt but have an opposite direction. The natural tilt damping moments of a lifting rotor have their origin in the gyroscopic blade moments. To this end there are provided feedback loops containing aircraft rate of tilt meters. In the first place the rate of aircraft tilt is the angular velocity of the aircraft about the transverse or longitudinal axis. Therefore, a rate of tilt meter is a device which produces signals representative of the aircraft rate of tilt. Such a meter may be an electric angular velocity pick-up or a gyroscope. By providing such meters, the artificial tilt damping of the aircraft can be made sufficiently large to produce a noticeable reduction in gust sensitivity in tilt. However, this is accomplished at the penalty of a sluggish control response.

In the system of the invention the artificial tilt damping may be selected sufficiently small to guarantee a rapid control response. This is due to the fact that the fast reacting control feedback loops containing the rotor moment meters in tilt already suppress gust effects in tilt so that the artificial damping device is not needed to alleviate gust effects. A rotor moment meter is a device which produces signals representative of the rotor moment about a predetermined reference axis. Such meters may be electrical strain gauges, or electrical or hydraulic pressure transducers at a rotor support which transmits forces proportional to the rotor moment.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings, wherein:

FIG. 1 is a side elevational view of a rotary wing aircraft embodying the control system of the invention;

FIG. 2 is a schematic sectional view of a lifting rotor embodying the invention;

FIG 3 is a sectional view taken on line 3—3 of FIG. 2 and showing the blade feathering control;

FIG. 4 is a sectional view taken on line 4—4 of FIG. 2 and showing part of the control linkage for the swashplate;

FIG. 5 is a sectional view taken on line 5—5 of FIG. 2 showing details of the tilt gyro controller;

FIG. 6 is a block diagram illustrating the feedback loop of the control system of the invention having two branches;

FIG. 7 is a detail view, parts being broken away, of an alternative control linkage; and FIG. 8 is a side elevational view of another embodiment of the invention where the rotor support is rotatable on the airframe.

Referring now to the drawings, and particularly to FIG. 1 there is illustrated by way of example an aircraft of the type to which the lifting rotor and its control system in accordance with the invention may be applied. Thus the aircraft 10 has a lifting rotor 11 and a tail rotor 12. Instead of having one lifting rotor as shown, the aircraft 10 may have more than one lifting rotor, or it may have fixed wings in addition to rotary wings, or it may have additional propulsion means such as propellers, or jet engines providing forward thrust. It is further feasible to provide a lifting rotor which is tiltable forward through an angle of 90° to act as a prop rotor in cruising flight.

Referring now to FIGS. 2 to 5 there is illustrated, by way of example, an embodiment of the invention for controlling feathering of the blades of a lifting rotor. Thus there is illustrated a rotor hub 14 forming part of the lifting rotor system. The rotor hub 14 has sockets 15, only one of which is illustrated, and each of which carries a feathering bearing 16 for permitting feathering of the blades 17. The blades 17 are shown connected to the rotor 14 without flapping hinges; hence there is illustrated a rigid blade rotor. However, the system of the invention as described hereinafter will function equally well if blade flapping hinges with horizontal axes F (see FIG. 3) were used.

The blade and feathering axis A is inclined upwardly with respect to the rotor plane R by a small coning angle. This coning angle is selected in such a manner that the resultant of the blade lift forces and of the blade centrifugal forces coincides for normal flight (shown by arrow 18 in FIG. 2) with the direction of the feathering axis A. This will minimize transverse loads on the feathering bearing 16. The bearings 16 must transfer the axial blade load to the hub 14. The axial blade load may also be transferred to the hub by means of flexible straps or torsion rods in a manner well known in the art to reduce the bearing loads.

The rotor hub 14 encloses blade feathering arms 20 which are operated and controlled by vertical links 21 from a swashplate 22. The swashplate has, as is conventional, an outer non-rotating ring 23 and an inner rotating ring 24 which is rotatably supported by the outer ring 23 through a bearing 25. The feathering arm 20 extends in the direction of rotation of the rotor.

The angle φ shown in FIG. 3 is defined as the control advanced angle. For a lifting rotor of conventional design the selection of this angle is rather critical in order to avoid cross-coupling effects between aircraft pitch and roll control. In other words, a temporary rolling may occur when applying pitch control and vice versa. For a lifting rotor system in accordance with the invention the selection of the control advance angle φ is less critical and an angle of 70° may be assumed as a usable value. The reason is that rotor tilt moments are automatically suppressed except for those required by the pilot's control.

The rotating portion 24 of the swashplate 22 is connected to the vertical links 21. The swashplate 22 can be moved vertically by means, not illustrated, and conventional. This vertical upward movement of the swashplate produces a collective increase in the blade feathering angle while a downward motion causes a collective decrease of the blade feathering angle. The non-rotating outer ring 23 of the swashplate carries sockets 26 connected to a horizontal fork 27 which, in turn, connects to a horizontal actuating link 28 operated in the fore and aft directions by a power actuator 30.

Any suitable hydraulic, pneumatic, mechanical or electrical actuator may be used. I have found it desirable to utilize an irreversible or insulating actuator. This may be defined as an actuator where the position of the actuating link 28 is not influenced by forces originating in the blades 17 and transferred to the actuating link 28 by the swashplate 22, sockets 26 and fork 27. In other words, the output motion of the actuator should not distort the input signal which may be an input force.

It is further feasible to utilize an actuator of the on-off type so that a relatively small displacement of the input link 31 of the actuator is sufficient to operate the actuator and cause the necessary movement of the actuating link 28. It may also be found desirable for certain applications to provide a power actuator so constructed that the rate of displacement of the actuating link 28 increases with the force applied to the input link 31.

The power actuator 30 is activated by the input link 31. As pointed out, this preferably requires only a very small horizontal displacement of the input link 31 to operate the actuator. When the actuator is of the on-off type, a small motion of the input link 31 results in a constant-velocity motion of the actuating link 28. Since a simple on-off actuator may chatter, it may become necessary to use a refined version of the actuator where the velocity of the motion of the actuating link 28 increases with the force applied to the input link 31.

The swashplate tilts about its axis S so that a motion of actuating link 28 to the left results in an aft tilt of the swashplate and a feathering of the blades producing a nose-up aircraft pitching motion. Thus, a nose-up pitching motion takes place about the transverse aircraft axis and is in a clockwise direction when seen from the left. A nose-down motion is the opposite motion.

The hub 14 is capable of tilting with respect to a hollow rotor shaft 32 about its axis H. The rotor hub 14 is connected to the rotor shaft 32 by means of a cardan or universal joint as is well known. According to the present invention tilting motions of the hub 14 with respect to by the tilting motion of the hub 14 by means of a walkingly, the universal joint may be designed for very small tilting angles, thus much simplifying its design. Instead of bearings, flexures or torsion rods may be used for the universal joint.

The input link 31 for the power actuator 30 is operated by the tilting motion of the hub 14 by means of a walking beam 33 having a fixed central pivot 34, a horizontal link 35 pivoted to the lower end of the walking beam 33 and pivoted in turn to a non-rotating beam 36 extending through the hollow center of the rotor shaft 32. The non-rotating beam 36 is cantilevered from the hub 14 by means of a bearing 37.

If, as an effect of a gust or maneuver the hub 14 tends to tilt in the nose-down direction, the lower end point of the beam 36 moves aft, producing an aft motion of the horizontal link 35. This rotates the walking beam in a counter-clockwise direction (as seen in FIG. 2) to move the input link 31 forward into the power actuator 30. The actuating link 28 now moves also in a forward direction, thereby moving fork 27 and sockets 26 also in a forward direction, thus producing a nose-up tilting of the swashplate 22 about its tilting axis S. The blade feathering produced by this nose-up tilting of the swashplate 22 tends to tilt the hub 14 in the nose-up direction, thereby compensating for the assumed nose-down hub tilt from a gust or maneuver.

Equilibrium will be reached when the input link 31 is again force free. This means that the hub 14 is moment free and in its neutral position. The only hub tilting angle occurring during the automatic control process is produced by the small motion of the input link 31 and by the mechanical flexibility of the linkage 33, 35 and 36. The maximum speed of motion of the actuating link 28 should be carefully selected. This speed should be sufficiently high to properly compensate for gusts and other effects. On the other hand, this speed should not be so high as to cause hunting of the automatic control system.

A rotor support 38 is attached to the airframe and hence fixed with respect to the aircraft. The rotor support 38 also includes rotor shaft bearings, not shown. These transfer the rotor shaft loads to the rotor support 38 and thence to the airframe. The rotor support 38 may also contain gearing to drive the rotor shaft and a gyro-40.

The system as explained so far provides for automatic blade feathering control in pitch which will keep the pitching moment about the rotor center approximately zero independent of gusts or maneuvers. At the same time it will prevent tilting motions of the hub except for the small angle necessary to operate the input link 31 of the power actuator. It is to be noted that while control in pitch has been referred to in connection with FIGS. 2 to 5, that this applies generally to the control of tilt. FIG. 8, to which reference will be made hereinafter, shows roll control which again indicates the control of tilt.

It is to be noted that the beam 36 carries the tilting moment of the rotor which is cardanically hinged to the rotor shaft 32. Therefore the side force at the low end of the beam 36 is proportional to the rotor tilting moment. It is also feasible to apply strain gage to the beam 36 and feed the strain gage signal into the system.

In order to obtain a pilot imposed pitching moment there may be provided a spring cartridge 41 connected to the lower end of the beam 36. A link 42 is connected to a pilot's control stick 43 having a hand grip 44 and pivoted at its upper end at 45 to the rotor support 38. It will be noted that the pilot's control 43, 44 is actually inverted to save control linkage; however, it may also be pivoted to the floor of the pilot's compartment.

The spring cartridge 41 has a housing 46 secured to the beam 36. The link 42 has at its outer end a disc 47 against which two springs 48 and 50 bear from opposite sides. Hence movement of the control stick 43, 44 is transferred to the beam 36 by means of the two springs which are normally balanced.

If, for example, the pilot moves the hand grip 44 forward, a forward force is transferred by the spring 50 to the beam 36 and thence by the horizontal link 35 to the lower end of the walking beam 33. The upper end of the walking beam 33 then applies to the input link 31 a force in the aft direction to move the input link 31 and the actuating link 28 both rearwards. This causes the swashplate 22 to tilt in the nose-down direction by means of the fork 27 and sockets 26. Equilibrium is reached when the input link 31 is force free and again in its neutral position.

In this equilibrium position the blades 17 transmit to the hub 14 a nose-down pitching moment equal to the spring force of cartridge 41 times the length of the beam 36 between its lower end and the tilting hub axis H. Since the lower end point of beam 36 moves by a very small amount, the mechanical advantages between the displacement of the pilot's control 43 and the displacement of the link 42 can be made quite large without excessive dead play in the pilot's stick. For very large rotor craft it may become necessary to operate the springs 48, 50 of the cartridge 41 by a power actuator in order to obtain the necessary hub pitching moment with the available pilot's control force.

The system described so far provides for a pitching moment on the rotor craft in proportion to the pilot's control stick deflection independent of gusts or maneuver effects. Such a rotor craft would be all but unflyable because of the lack of pitch damping of the aircraft.

Accordingly, in accordance with the present invention the control system is complemented by the pitch gyro controller 40 which includes a flywheel driven by a flexible vertical shaft 53 and supported by a horizontal shaft 54 having bearings in fixed sockets 55. There may also be provided a damper 56 for damping the rotation of the shaft 54. The rotational motion of the shaft 54 is transmitted by means of an arm 57, vertical link 58 and two-armed lever 60, having its free arm pivoted at 61 to the horizontal link 35.

The direction of rotation of the flywheel 52 is selected in such a manner that a nose-down pitching velocity of the aircraft will produce a rotation of the shaft 54 (gyro precession) in the sense of moving the horizontal link 35 in the aft direction. This causes a forward motion of the input link 31 and of the actuating link 28 to tilt the swashplate 22 nose-up.

For constant nose-down pitching velocity of the rotor craft equilibrium is reached when the input link 31 is force free again and in its neutral position. In this equilibrium position the blades 17 transmit to the hub 14 a nose-up moment which is equal to the force applied to the gyro controller 40 via the linkage 57, 58, 60 to the horizontal link 35 multiplied by the length of the beam 36 between its lower end and the hub tilting axis H. Since the precession moment of the gyro controller 40 about the shaft 54 is proportional to the pitching velocity of the rotor craft, the pitching moment about the rotor center induced by the gyro controller is also proportional to the pitching velocity of the rotor craft and opposite in direction. This is characteristic of positive pitch damping for the aircraft.

By a proper selection of rotational speed and moment of inertia of the flywheel 52 and by proper selection of the mechanical advantage between the rotational deflection of the shaft 54 and of the hub tilting angle about the axis H, any desired degree of pitch damping may be achieved.

The lifting rotor system as explained up to now will provide good flying characteristics of the rotor craft. The effects of gusts or maneuvers on rotor pitching moments about the rotor center are almost zero. The rotor craft responds to a fore or aft deflection of the pitch control stick with a nose-down or nose-up pitching velocity in proportion to the stick deflection. This is true because in the equilibrium position when the input link 31 is force free the spring force of springs 48, 50 of the spring cartridge 41 will just balance the force acting on the horizontal link 35 from the gyro controller 40.

If a rotor pitching moment on the aircraft is required in steady flight for trim purposes, the pitch control stick 43 must be deflected accordingly. The stick force from the spring cartridge 41 may be neutralized by a conventional stick force trim mechanism. This may consist, for example, of a trim lever 63, pivoted to the rotor support 38 at 62, ratchet 64 with retainer or pawl 65, lever or spring carrier 66 pivoted to the trim lever 63 and to an idler arm 67 also pivoted at 68 to the rotor support 38. A pair of springs 70 bear against opposite sides of the pilot stick 43 to exert a predetermined spring force on the control stick which will balance the spring force provided by the spring cartridge 41.

Further improved stability characteristic of the rotor craft may be provided by adding elastic flexibilty to the gyro controller linkage 54, 57, 58 and 60 and by damping the rotational deflection of the shaft 54 by the damper 56. It is well known that a pitch gyro controller with damping and elastic flexibility not only provides pitch damping but also a so-called proportional input to the control system. Ths means that a nose-up pitching displacement produces a nose-down pitching moment on the aircraft in proportion to the nose-up deflection, thereby improving the stability characteristics of the aircraft.

It should be understood again that the same mechanism disclosed in connection with FIGS. 2 through 5 may be applied equally well to the control of roll as it does to the pitch control. In other words, the system of the invention serves the purpose to control tilt of the aircraft regardless of whether it is roll or pitch.

Referring now to FIG. 6 there is illustrated a block diagram of the control system of the present invention. Thus the pilot control 75 feeds a control signal under the control of the pilot stick 43 and hand grip 44 into a signal comparator 76. The resulting error signal is fed to the power actuator 77 for controlling the rotor tilting moment in the manner previously explained. The aircraft rate of tilt sensor 78 feeds a signal into the signal comparator as does the rotor tilting moment sensor 80. The three signals, viz. the aircraft rate of tilt signal, the rotor tilting moment signal and the control signal are compared by the signal comparator 76. An error signal is produced until the aircraft tilt corresponds to that required by the control signal at which time the error signal vanishes and the power actuator becomes inoperative.

It should be noted that the rotor tilting moment is developed very rapidly, that is, as soon as the blade feathering mechanism begins to adjust the feathering angle. On the other hand, the aircraft rate of tilt develops rather slowly. Therefore the feedback has a rapid-action loop or branch including the rotor tilting moment sensor and a slow-acting loop including the aircraft rate of tilt sensor.

Comparing the block diagram of FIG. 6 to the embodiment of the invention illustrated in FIGS. 1 through 5 it will be seen that the beam 36 serves as the rotor tilting moment sensor. The rotor tilting moment signal consists of a horizontal force transmitted at the lower end of the beam 36 to the horizontal link 35. The horizontal link 35 serves as the signal comparator since it accepts a demand or control signal from the pilot in the form of a horizontal force applied through the spring cartridge 41. It also accepts a compensating signal from the rotor tilting moment meter (beam 36) in the form of a horizontal force applied by the beam 36, and it accepts a compensating signal in the form of a horizontal force applied by the lever 60 from the aircraft rate of tilt meter which is the gyro controller 40. The resultant error signal is the force transmitted via the walking beam 33 to the input link 31 of the power actuator 30.

FIG. 7 to which reference is now made illustrates an alternative detail of the control linkage of FIG. 2 which is particularly useful for compound, fixed-wing, rotary-wing aircraft operating at high advance ratios. In such an aircraft it is desirable to adjust the relative attitude of rotor plane and fixed wing. For this purpose the horizontal link 35 rather than being directly connected to the lower end of the beam 36 as in FIG. 2 is connected to a rotor trim actuator 82 which extends and retracts an output link 83 pivoted to the lower end of the beam 36 thereby tilting the rotor about its axis H. The actuator 82 may receive its input signal from a pilot operated rotor trim knob or lever, not illustrated.

Alternatively, the actuator 82 may receive its input signal from a rotor speed governor 84 shown connected thereto. The rotor speed governor is, of course, coupled to the rotor to measure its speed. In this manner a deficiency in rotor speed produces a nose-up tilting motion of the rotor and an excess in rotor speed produces a nose-down tilting motion of the rotor.

It is well known that by such means the rotor speed may be kept constant also during autorotation when no driving torque is applied to the rotor shaft. Such a condition is desirable in cruising flight of a compound, rotary-wing, fixed-wing aircraft.

The embodiments of the invention illustrated in FIGS. 2 to 5 and 7 are useful if the rotor is either of the rigid type or if the blade flapping hinges are offset from the rotor center thereby producing a hub tilting moment in proportion to the tilting angle of the blade tip path plane. However, if the flapping hinges are located in the rotor center, the embodiment of FIG. 8 may be used instead. As example of such flapping hinges is the see-saw rotor having two blades rigidly interconnected but capable of flapping about a common hinge in the rotor center.

Here the rotor support 38 is rotatably connected to the airframe by means of fixed sockets 85. The beam 36, rather than being attached to the hub 14 as in FIG. 2, is now attached to the rotor support 38. The lower end of the beam 36 carries horizontal forces in proportion to the rotor moment about the axis T and these forces are balanced by the forces from spring cartridge 41 and from horizontal link 35 in the same manner as explained in connection with FIGS. 2 to 5.

As pointed out hereinbefore, it is also feasible to develop electrical signals rather than force signals as explained in connection with FIGS. 1 through 5, 7 and 8. To this end, strain gages may be used which, of course, develop an electrical output signal. These strain gages may be secured, for example, to the horizontal link 35, the non-rotating beam 36 and the spring cartridge 41 to measure the forces on these elements. These electric signals may then be applied to the signal comparator 76 to develop the error signal. This error signal, in turn, then controls the rate of displacement of the actuating link 28. To this end the junction of the horizontal link 35, the beam 36 and the spring cartridge 41 preferably is held fixed by a rigid support. This makes it possible to provide electrical output signals by means of electrical strain gages.

The invention and its attendant advantages will be understood from the foregoing description and it will be apparent that various changes may be made in the form, construction and arrangement of the parts of the invention without departing from the spirit and scope thereof or sacrificing its material advantages, the arrangement hereinbefore described merely by way of example and I do not wish to be restricted to the specific form shown or uses mentioned except as defined in the accompanying claims, wherein various portions have been separated for clarity of reading and not for emphasis.

What is claimed is:

1. In an aircraft of the type having an airframe, a lifting rotor, attached to the airframe and a plurality of blades, an automatic control system for controlling the tilt of the aircraft comprising:
    (a) mechanism for controlling feathering of the blades, thereby to control the rotor tilting moment on said airframe;
    (b) a power actuator coupled to said mechanism;
    (c) a sensor coupled to said rotor for developing output signals representative of the tilting moment of said rotor on said airframe;
    (d) manually operable control means for producing control signals representative of the desired rotor tilting moment on said airframe;
    (e) a signal comparator coupled to said control means, and to said sensor for developing an error signal representative of the difference between the control signals and the output signals developed by said sensor and;
    (f) means for impressing said error signal on said power actuator for adjusting blade feathering until said error signal vanishes.

2. In an aircraft of the type having an airframe, a lifting rotor attached to the airframe and a plurality of blades, an automatic control system for controlling the tilt of the aircraft comprising:
    (a) mechanism for controlling feathering of the blades, thereby to control the rotor tilting moment on said airframe;
    (c) a rotor moment sensor coupled to said rotor for producing a force representative of the rotor tilting moment on said airframe;
    (d) a rate of tilt of the aircraft sensor coupled to said aircraft for producing a force representative of the rate of tilt of said aircraft;
    (e) manually operable control means for developing a control force representative of the desired rate of aircraft tilt; and
    (f) linkages interconnecting said sensors and said control means to said input links for developing and transmitting a resultant error force representative of the difference between said control force and the forces produced by said sensors to said input link, thereby to adjust the blade feathering until said error force vanishes.

3. In an aircraft as defined in claim 2 wherein a rotor hub is provided, said blades being connected to said rotor hub in such a manner as to allow changes of the feathering angle of said blades by said mechanism, a rotor shaft, said rotor hub being tiltably connected to said rotor shaft, wherein said rotor moment sensor includes non-rotatable means coupled to said rotor hub for preventing tilting of said hub, whereby the forces transferred from said hub to said non-rotatable means are responsive to the rotor tilting moments about the hub tilting axes.

4. In an aircraft of the type having an airframe, a lifting rotor attached to said airframe and having a plurality of blades;
    (a) an automatic control system for controlling the tilt of the aircraft comprising;
    (b) mechanism for controlling feathering of said blades, thereby to control the rotor tilting moment on said airframe;

(c) a rotor hub, said blades being connected to said rotor hub in such a manner as to allow changes of the feathering angle of said blades by said mechanism;

(d) a hollow rotor shaft, said rotor hub being tiltably connected to said rotor shaft;

(e) a power actuator having an actuating link coupled to said mechanism and having an input link, said power actuator providing a rate of displacement of said actuating link representative of the force exerted on said input link;

(f) a rotor moment sensor including a non-rotating beam disposed within said hollow rotor shaft and rotatably connected to said rotor hub for preventing tilting of said hub, whereby the forces transferred from said hub to said non-rotating beam are responsive to the rotor tilting moments about the hub tilting axes;

(g) a rate of tilt of the aircraft sensor coupled to said aircraft for producing a force representative of the rate of tilt of said aircraft;

(h) manually operable control means for developing a control force representative of the desired rate of aircraft tilt; and (i) linkages interconnecting said sensors and said control means to said input links for developing and transmitting a resultant error force representative of the difference between said control force and the forces produced by said sensors to said input link, thereby to adjust the blade feathering until said error force vanishes.

5. In an aircraft of the type having an airframe, an automatic control system for controlling the tilt of the aircraft comprising:

(a) a lifting rotor attached to said airframe and having a plurality of blades;

(b) a rotor shaft;

(c) a rotor support on said airframe, said rotor shaft being rotatably connected to said rotor support;

(d) mechanism for controlling feathering of the blades, thereby to control the rotor tilting moment on said airframe;

(e) a power actuator having an actuating link coupled to said mechanism and having an input link, said power actuator providing a rate of displacement of said actuating link representative of the force exerted on said input link;

(f) a rotor moment sensor including a tilting shaft coupled to said rotor support so that said rotor support can tilt with respect to said tilting shaft;

(g) restraining means coupled to said rotor support to prevent tilting thereof, whereby the forces transferred from said rotor support to said restraining means are representative of the rotor tilting moments about said tilting shaft;

(h) a rate of tilt of the aircraft sensor coupled to said aircraft for producing a force representative of the rate of tilt of said aircraft;

(i) manually operable control means for developing a control force representative of the desired rate of aircraft tilt; and (j) linkages interconnecting said sensors and said control means to said input links for developing and transmitting a resultant error force representative of the difference between said control force and the forces produced by said sensors to said input link, thereby to adjust the blade feathering until said error force vanishes.

6. In an aircraft as defined in claim 2 wherein said power actuator is of the on-off type so that a relatively small displacement of said input link is sufficient to actuate said power actuator.

7. In an aircraft as defined in claim 2 wherein said power actuator is so constructed that the rate of displacement of said actuating link increases with the force applied to said input link.

8. In an aircraft as defined in claim 2 wherein said manually operable control means includes a spring cartridge connected to said interconnecting linkages, said cartridge applying a force to said input link in accordance with control deflections of said control means.

9. In an aircraft as defined in claim 8 wherein a force trim mechanism is coupled to said control means for balancing during steady state conditions the spring force developed by said cartridge.

10. In an aircraft as defined in claim 2 wherein a gyro tilt controller is coupled to said aircraft and an auxiliary linkage is coupled between said gyro tilt controller and said interconnecting linkages for transferring forces representative of gyro precession moments to said interconnecting linkage.

11. In an aircraft as defined in claim 5 wherein a gyro tilt controller is coupled to said aircraft and an auxiliary linkage is coupled between said gyro tilt controller and said interconnecting linkages for transferring forces representative of gyro precession moments to said interconnecting linkage, and wherein elastic and damping means are included in said auxiliary linkage, thereby to permit elastic and damped motions of said gyro controller with respect to said interconnecting linkages.

12. In an aircraft as defined in claim 5 wherein a rotor attitude actuator is coupled to said interconnecting linkages for varying the lengths thereof, and wherein a rotor speed governor is coupled to said rotor attitude actuator for use in autorotational flight and for increasing the nose-up rotor attitude when the rotor speed drops below a predetermined rotor speed and vice versa.

13. In an aircraft as defined in claim 2 wherein a rotor attitude actuator is coupled to said interconnecting linkages for varying the lengths thereof.

14. In an aircraft of the type having an airframe, a lifting rotor attached to the airframe and having a plurality of blades, an automatic control system for controlling the tilt of the aircraft comprising:

(a) mechanism for controlling collective feathering of the blades, thereby to control the rotor lift on said airframe;

(b) a power actuator coupled to said mechanism;

(c) a sensor coupled to said rotor for directly sensing the lift of the rotor on said airframe and for developing output signals in proportion to said lift;

(d) manually operable control means for producing control signals representative of the desired rotor lift;

(e) a signal comparator coupled to said control means and to said sensor for developing an error signal representative of the difference between said control signals and said output signals developed by said sensor; and (f) means for impressing said error signal on said power actuator for adjusting the collective feathering of said blades until said error signal vanishes.

References Cited

UNITED STATES PATENTS

| 2,605,093 | 7/1952 | Dorand | 170—160.5 X |
| 3,008,670 | 11/1961 | Guarino et al. | 244—17.13 |
| 3,037,722 | 6/1962 | Gerstenberger et al. | 244—17.13 |
| 3,099,421 | 7/1963 | Gerstine | 244—17.13 |
| 3,175,786 | 3/1965 | Frank et al. | 170—160.14 X |
| 3,369,778 | 2/1968 | Ciscel | 244—17.13 X |

FOREIGN PATENTS

| 487,128 | 10/1952 | Canada. |
| 868,199 | 5/1961 | Great Britain. |
| 503,406 | 11/1951 | Belgium. |

EVERETTE A. POWELL, Jr., *Primary Examiner.*

U.S. Cl. X.R.

244—17.13; 170—160.26, 160.13

UNITED STATES PATENT OFFICE
CERTIFICATE OF CORRECTION

Patent No. 3,429,376                                          February 25, 1969

Kurt H. Hohenemser

It is certified that error appears in the above identified patent and that said Letters Patent are hereby corrected as shown below:

Column 10, after line 43 insert the following:

(b) a power actuator having an actuating link coupled to said mechanism and having an input link, said power actuator providing a rate of displacement of said actuating link representative of the force exerted on said input link;

Signed and sealed this 2nd day of June 1970.

(SEAL)
Attest:

Edward M. Fletcher, Jr.
Attesting Officer

WILLIAM E. SCHUYLER, JR.
Commissioner of Patents